United States Patent
Ramanujam et al.

(10) Patent No.: US 7,505,996 B2
(45) Date of Patent: Mar. 17, 2009

(54) DATA CONVERSION

(75) Inventors: Srinivasan Ramanujam, Boise, ID (US); Scott A. Jeide, Meridian, ID (US); Raja Annadurai, Boise, ID (US)

(73) Assignee: Extended Systems, Inc., Boise, ID (US)

( * ) Notice: Subject to any disclaimer, the term of this patent is extended or adjusted under 35 U.S.C. 154(b) by 990 days.

(21) Appl. No.: 10/126,633

(22) Filed: Apr. 19, 2002

(65) Prior Publication Data

US 2003/0200230 A1      Oct. 23, 2003

(51) Int. Cl.
*G06F 7/00*    (2006.01)
*G06F 15/16*   (2006.01)

(52) U.S. Cl. .................... 707/104.1; 709/203

(58) Field of Classification Search ............ 709/227, 709/213; 707/10, 203; 379/93.23; 345/179; 715/503
See application file for complete search history.

(56) References Cited

U.S. PATENT DOCUMENTS

| | | | | |
|---|---|---|---|---|
| 5,887,141 A | * | 3/1999 | Trugman | 709/227 |
| 5,974,238 A | * | 10/1999 | Chase, Jr. | 709/248 |
| 6,549,918 B1 | * | 4/2003 | Probert et al. | 707/203 |
| 6,603,464 B1 | * | 8/2003 | Rabin | 345/179 |
| 6,925,481 B2 | * | 8/2005 | Singhal et al. | 709/200 |
| 2002/0004819 A1 | * | 1/2002 | Agassy et al. | 709/203 |

* cited by examiner

*Primary Examiner*—Apu Mofiz
*Assistant Examiner*—Susan Chen
(74) *Attorney, Agent, or Firm*—Ormiston & McKinney, PLLC (57) ABSTRACT

Converting a electronic files. An initial step involves determining whether an electronic file contains distinct data strings or simple text associated with marks. Where the electronic file contains distinct data strings, those distinct data strings are located, and, from each distinct data string, format data is obtained. The distinct data string is then converted to simple text and associated with a mark, the mark representing the format data. Where the electronic file contains simple text associated with marks, those marks are located, for each located mark, the simple text associated with that mark is identified. The simple text is then formatted according to the mark forming a distinct data string.

6 Claims, 9 Drawing Sheets

DATA CONVERSION

FIELD OF THE INVENTION

This invention relates generally to converting electronic files. More specifically, this invention is directed to converting electronic files for use by two or more applications requiring differing data formats.

BACKGROUND OF THE INVENTION

In today's computer networks, sharing data among devices has become desirable if not essential. Not only does the shared data need to be replicated on each device, but the set of replicated data must be synchronized so that changes made to one replica are reflected in all the others. Synchronization enables many users to work with their own local copy of shared data but have the shared data updated as if they were working on a single, centralized database. For shared data applications where users are geographically widely distributed, replication and synchronization are often the most efficient methods for effectively utilizing shared data.

In addition to desktop computers (including workstations and servers), modern computing environments often include lightweight mobile computing devices that fit into a pocket, purse, or day planner. The memory and processor speeds of mobile devices are limited in comparison with desktop computers. A mobile device may, for example, have a processor running at two hundred megahertz and contain sixty-four megabytes of combined operational and storage memory. The operational memory holds the instructions from an application that the processor executes and the data that those instructions work with. The storage memory holds applications and data not in use by the processor. A desktop computer on the other hand may have a processor operating at two gigahertz, have two hundred-fifty six megabytes of operational memory, and have thirty gigabytes of storage memory. These numbers are of course relative. As technology progresses, the numbers will improve. However, it is expected that the computing power of a desktop most always will be greater than that of a mobile device.

The processor and memory constraints of mobile devices prevent them from utilizing more sophisticated applications available to desktop computers. For example, a word processor designed for a mobile device will typically not have the number of features available to a word processor designed for a desktop computer. The desktop's word processor will likely have the ability to format different sections of a document differently. Multiple fonts may be used. Different margins may be applied to different sections. The document may include one or more bulleted lists. The possibilities go on. The word processor on a mobile device, however, may function more like a simple text editor lacking anything but basic formatting functions. Consequently, a document created using a desktop word processor cannot be accessed by a mobile word processor without being converted to a simpler format. The conversion however removes all formatting from the document not compatible with the mobile word processor. When the document is returned to the desktop word processor, it must be reformatted.

Sharing electronic mail between desktop and mobile devices can also pose difficulties. Electronic mail editors designed for desktop computers are capable of multiple functions. In addition to sending text messages to one or more intended recipients, they are capable of sending meeting notifications and invitations, interacting with calendaring applications to schedule meetings, and managing task lists. While mobile devices are capable of generating text messages, many cannot create electronic mail. If they can, many still cannot send specialized messages such as a meeting notification or invitation let alone interact with a calendaring application or manage a task list.

The limitations of mobile devices often prevent them from interacting effectively with more powerful computing devices such as desktop computers.

SUMMARY OF THE INVENTION

The present invention is directed to data conversion techniques that enable applications designed for mobile devices to generate, edit, and display data that can be better utilized by more sophisticated applications and thereby interact more effectively with desktop devices. An initial step involves determining whether an electronic file contains distinct data strings or simple text associated with marks. Where the electronic file contains distinct data strings, those distinct data strings are located, and, from each distinct data string, format data is obtained. The distinct data string is then converted to simple text and associated with a mark, the mark representing the format data. Where the electronic file contains simple text associated with marks, those marks are located, and, for each located mark, the simple text associated with that mark is identified. The simple text is then formatted according to the mark forming a distinct data string.

DETAILED DESCRIPTION OF THE INVENTION

INTRODUCTION: In today's mobile computing environments electronic records are replicated and shared across many devices. Some devices such as desktop computers have memory and processor capabilities to run sophisticated applications. Many mobile devices, however, do not have such capabilities making it difficult for them to share records with their more powerful counterparts. It is expected that a data exchanger according to various embodiments of the invention described below will allow less sophisticated computing devices to more fully participate in today's computing environments.

Figure 1:
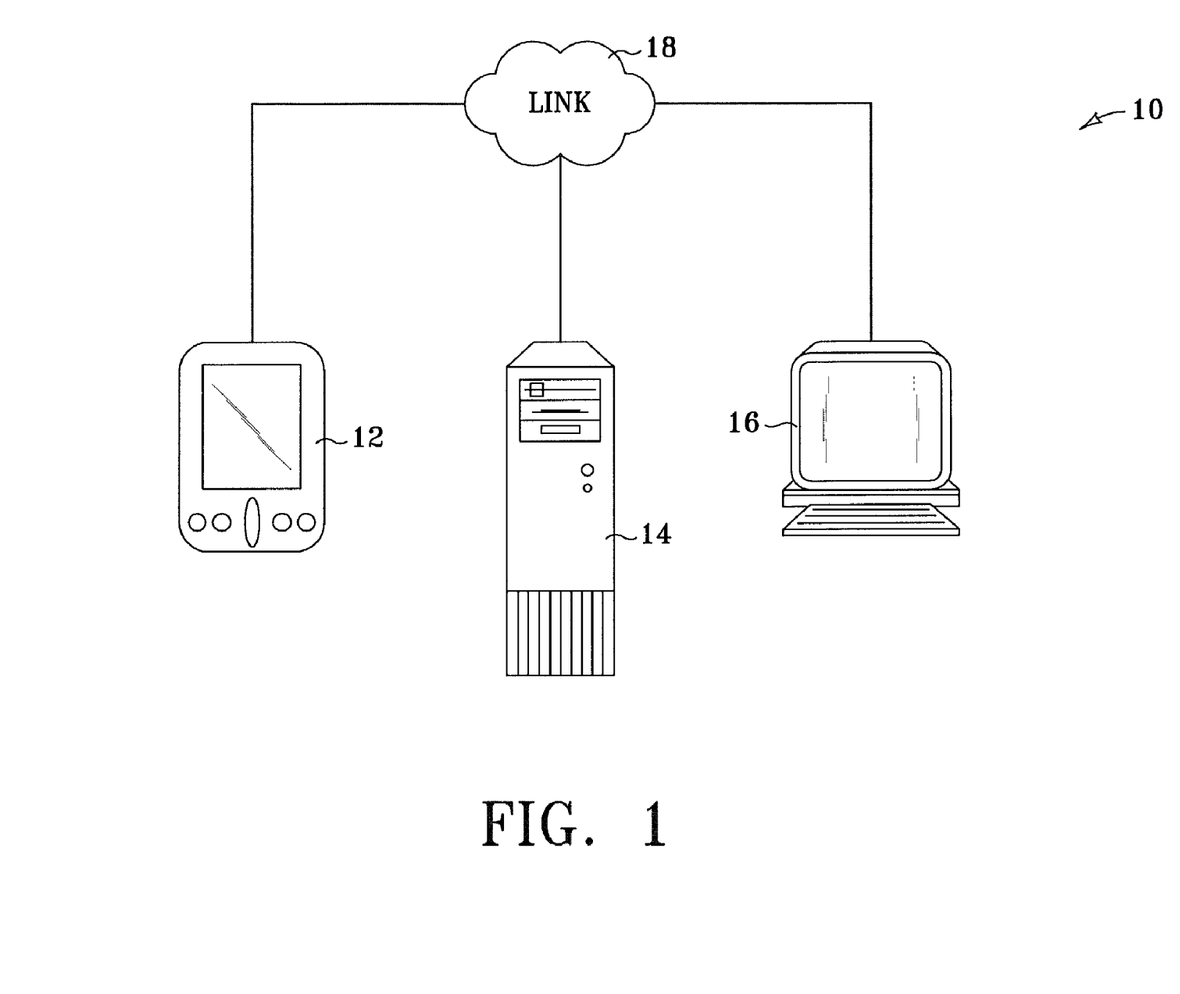
FIG. 1 is a schematic representation of a computing environment in which various embodiments of the present invention may be incorporated.

FIG. 1 illustrates a computing environment 10 in which various embodiments of the present invention may be incorporated. Embodiments of the present invention, however, may be incorporated in any environment in which it is desirable or necessary to share data between devices. Environment 10 includes computing devices interconnected by link 18. As shown, these devices include mobile device 12, server 14, and local device 16. Although mobile device 12 is illustrated as a PDA (Personal Digital Assistant) and local device 16 is shown as a desktop computer, devices 12, 14, and 16 represent any computing devices capable of sharing data over link 18. Link 18 represents generally any cable, wireless, or remote connection via a telecommunication link, an infrared link, a radio frequency link, cellular link, or any other connector or system that provides electronic communication between the devices. Link 18 may represent, in part, an intranet, the Internet, or a combination of both.

Figure 2:
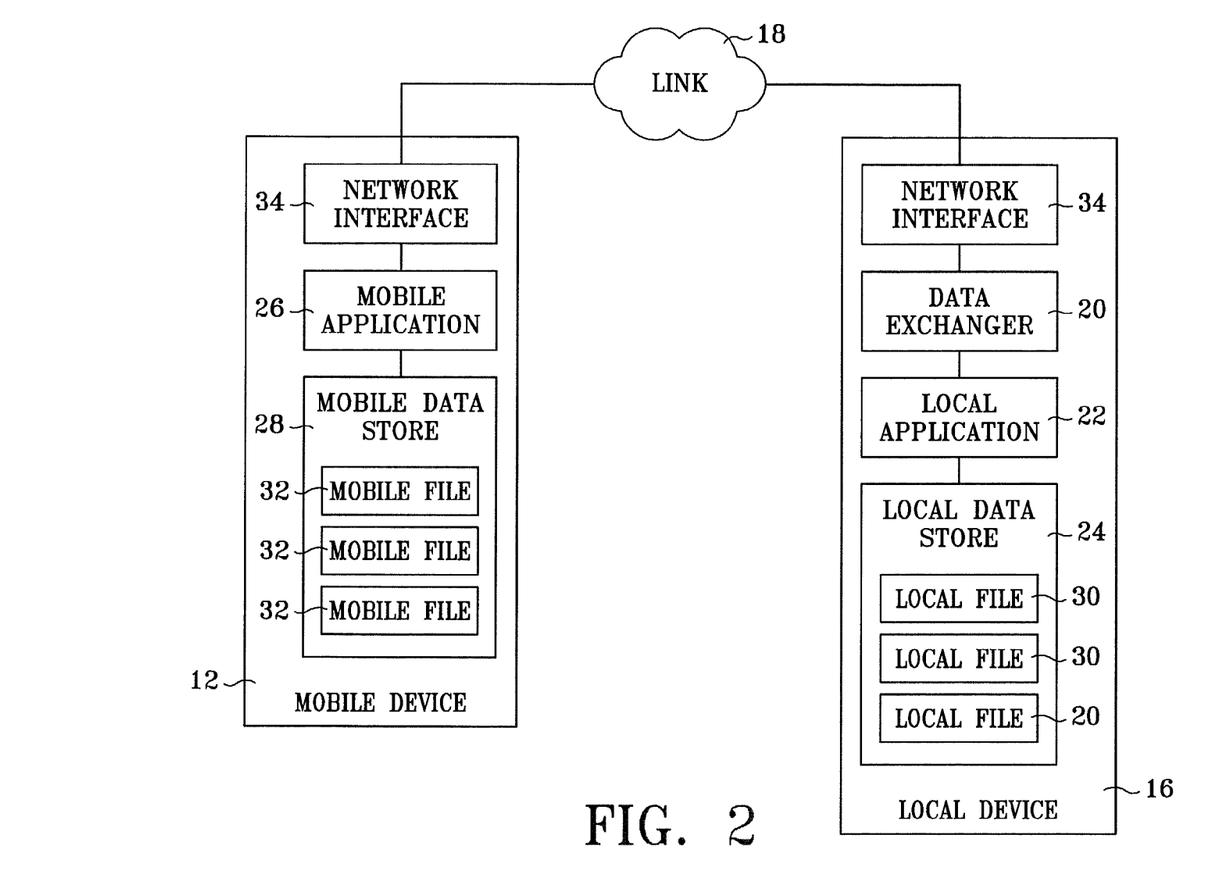
FIG. 2 is a block diagram showing one embodiment of the present invention implemented in a data exchanger operating on a local computer.
Figure 3:
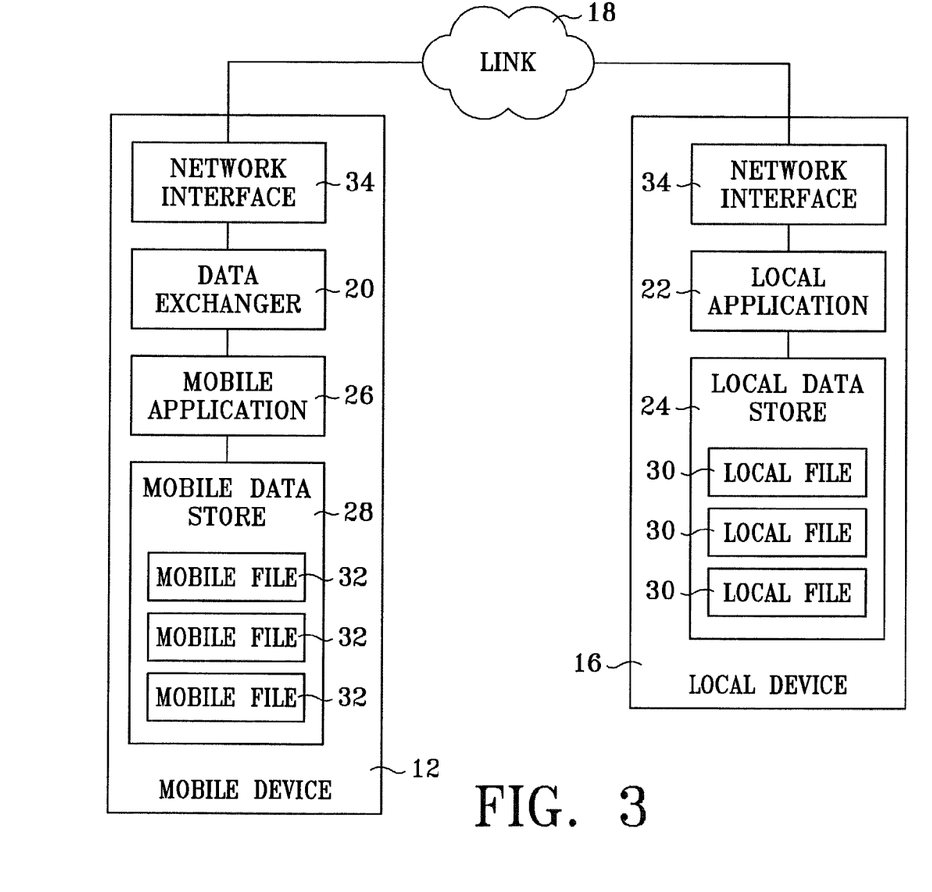
FIG. 3 is a block diagram showing another embodiment of the invention implemented in a data exchanger operating on a mobile device.
Figure 4:
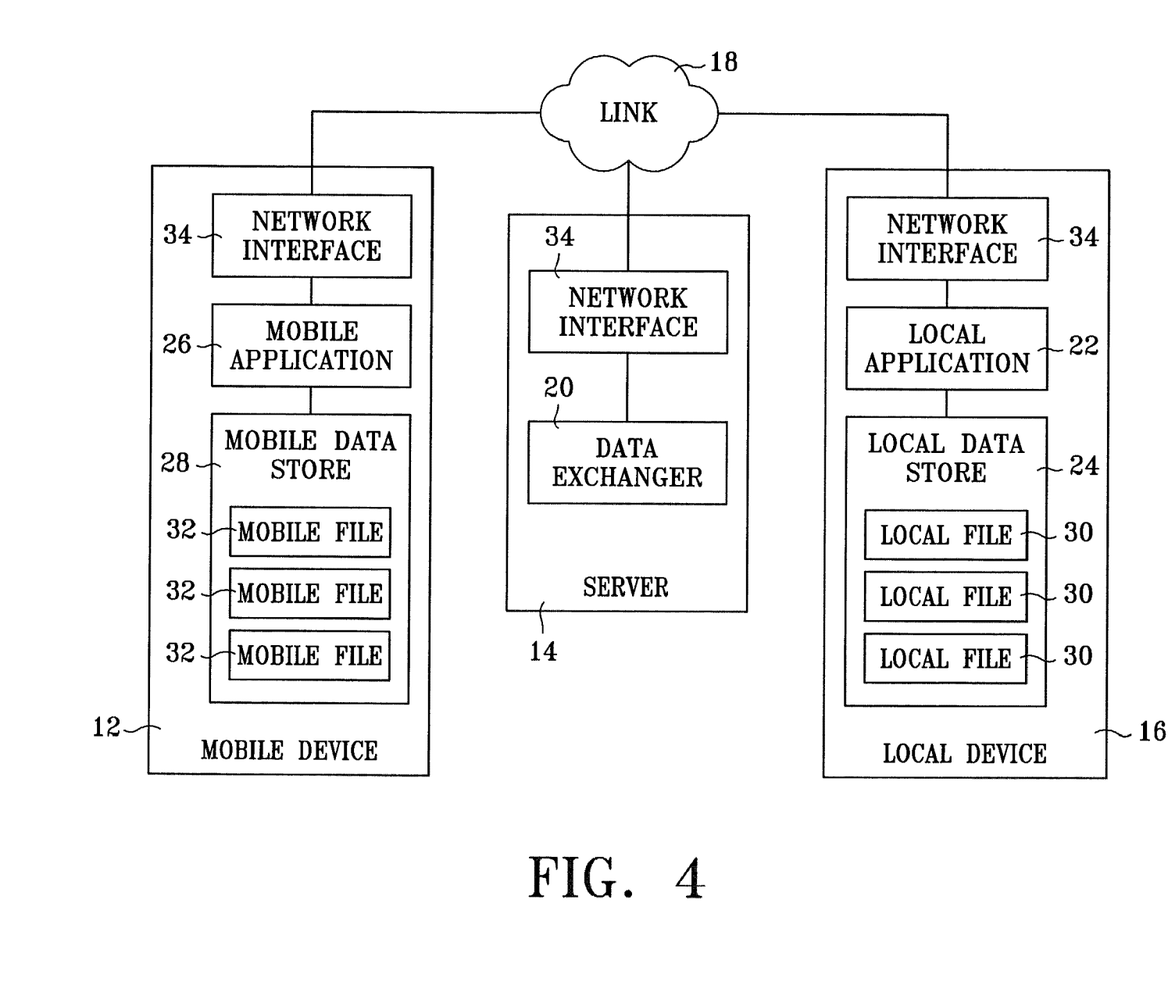
FIG. 4 is a block diagram showing another embodiment of the invention implemented in a data exchanger operating on a server.
Figure 5:
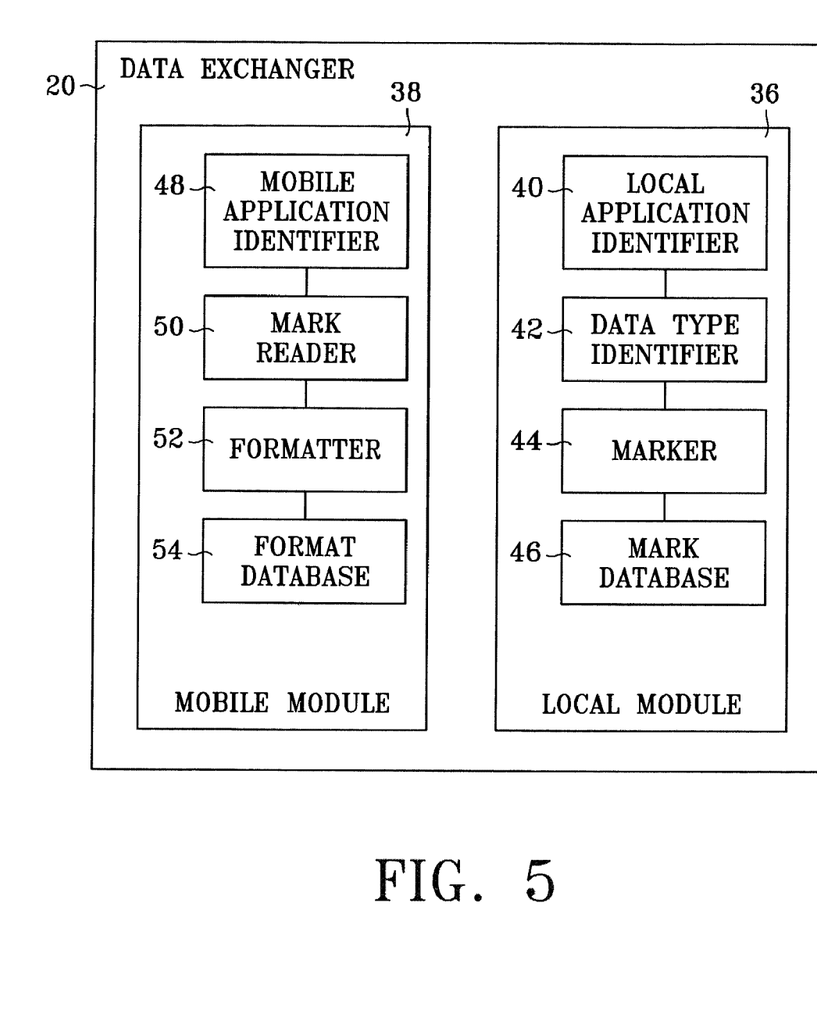
FIG. 5 is a block diagram illustrating the logical components of a data exchanger according to one embodiment of the present invention.

COMPONENTS: The logical components of one embodiment of the present invention will now be described with reference to the block diagrams of FIGS. 2-5. FIGS. 2 and 3 are block diagrams illustrating two computing devices—mobile device 12 and local device 16—interconnected by link 18. FIG. 4 is a block diagram illustrating three computing devices, mobile device 12, server 14, and local device 16, interconnected by link 18. In FIGS. 2-4, the invention is embodied in software or other programming labeled data exchanger 20. FIG. 5 is a block diagram illustrating the logical components of data exchanger 20.

Referring first to FIG. 2, data exchanger 20 is operating on local device 16. Local device 16 also includes local application 22 and local data store 24 while mobile device 12 includes mobile application 26 and mobile data store 28. Local application 22 represents generally any programming capable of generating and/or utilizing shared data files. A shared data file is electronic data that can be utilized by applications operating on different devices. Examples include word processor documents, spread sheets, electronic mail messages, calendar events, contact lists, and task lists. Local data store 24 is memory for storing shared data. In this example, the shared data stored in local data store 24 is labeled as local files 30 each having a format recognizable by local application 22. Mobile application 26 represents generally any programming capable of generating and/or utilizing shared data files, and mobile data store 28 is memory for storing shared data. The shared data stored in mobile data store 28 is labeled as mobile files 32 each having a format recognizable by mobile application 26.

It is expected that, on a relative scale, local application 22 will be more sophisticated than mobile application 26. Consequently, local files 30 will have a more sophisticated format than mobile files 32. The more sophisticated format can serve both aesthetic and functional purposes. As an example, mobile application 26 may be a simple text editor and mobile file 32 may be a text file while local application 22 may be a fully functional word processor and local file 30 may be a word processing document. When displayed, a text file is just that—text on a screen. A word processing document can include multiple fonts. Portions of the text may be in bold, italic, or underlined. The document may include bulleted or numbered lists. It may even include embedded graphics. Many more formatting options are available. The text editor will not be able to functionally utilize local files 30 until they are first converted into a more simple text format. The word processor will likely be able to utilize mobile files 30, but those files will not include desired formatting. Data exchanger 20 then represents generally any programming capable of converting electronic files used by local application 22 into a format useable by mobile application 26 as well as converting electronic files used by mobile application 26 into a more sophisticated format to be used by local application 22.

As illustrated in FIGS. 3 and 4, data exchanger 20 need not be located on local device 16. As shown in FIG. 3, data exchanger 20 may be located on mobile device 12, or, as shown in FIG. 4, on server 14. Where data exchanger 20 operates on server 14, it acts as an intermediary or translator between mobile device 12 and local device 16. Data shared between devices 12 and 16 is routed through server 14 to be converted by data exchanger 20. Ultimately, data exchanger 20 need only be accessible to local and mobile applications 22 and 26 over link 18. To enable communication over link 18, mobile device 12, server 14, and local device 16 each include network interface 34.

Referring now to FIG. 5, data exchanger 20 includes local module 36 and mobile module 38. Local module 36 represents programming capable of converting mobile files 32 into local files 30. Conversely, mobile module 38 represents programming capable of converting local files 30 into mobile files 32.

Local module 36 includes local application identifier 40, data type identifier 42, marker 44, and mark database 46. Local application identifier 40 represents generally any programming capable of identifying the application on local device 12 used to generate or utilize a particular local file 30. Data type identifier 42 represents generally any programming capable of identifying distinct data strings within a local file 30. A distinct data string is a portion of a local file 30 that shares common formatting. For example, an electronic mail message consists of a number of distinct data strings—data identifying the recipient, data identifying the sender, data representing the subject, data representing the body of the message, and data indicating acceptance or refusal to attend a requested meeting. A word processing document also consists of at least one and generally more distinct data strings. A report, for example, may have a table of contents formatted with a particular style, each section heading formatted with another style, and the body of each section with yet a third style. In this example, the table of contents is one distinct data string, each section header is a separate distinct data string, and the body of each section is a separate distinct data string. Where portions of the body of a section are formatted with a different font, include a graphic, have unique margins, or otherwise appear different, each such portion is a distinct data string.

To locate distinct data strings, it is expected that data type identifier 42 will scan local file 30 searching for format data. Format data is electronic information analyzed by local application 22 when utilizing distinct data strings. For example, where local file 30 is an electronic mail message, format data indicates whether a distinct data string identifies the sender or recipient or whether it represents the subject or body of the message. Where local file 30 is a word processing document, format data may identify the font and typeface of a given paragraph. Typically, when displaying local file 30, format data is not visible to the user.

Marker 44 represents programming capable of converting a distinct data string into simple text, associating the simple text with a mark, and compiling the simple text and associated mark with other simple text and mark pairs converted from distinct data strings, thus, forming a mobile file capable of being utilized on mobile device 12. Simple text is text without formatting. In the case of an electronic mail message, simple text may be the text of an electronic mail address. For a word processing document, simple text may be any text from the document. It may be a word, phrase, sentence, or paragraph. It may consist of any combination of letters, numbers, and/or symbols. A mark is data identifying the format of the distinct data string converted to simple text. In the case of a word processor document, a mark may indicate that the simple text associated with the mark is to include formatting such as a bold typeface, Times Roman font, and/or one inch margins. In the case of an electronic mail message, a mark may specify that the associated simple text identifies a sender or recipient, indicates acceptance or refusal to attend a meeting invitation, or represents the body of the message. Mark database 46 represents memory containing or at least capable of containing marks accessible to marker 44.

Mobile module 38 includes mobile application identifier 48, mark reader 50, formatter 52, and format database 54. Mobile application identifier 48 represents programming capable of identifying the application on mobile device 12 used to generate or utilize a particular mobile file 32. Mark reader 50 represents generally any programming capable of locating marks in mobile file 32 and identifying simple text associated with each mark. Formatter 52 represents any programming capable of formatting the simple text according to its associated mark, converting the simple text into a distinct data string, and compiling the converted distinct data string with other distinct data strings converted from simple text forming a local file capable of being utilized on local device 16. Format database 54 represents memory containing or at least capable of containing format data associated with marks used by formatter 52 to format simple text.

Figure 6:
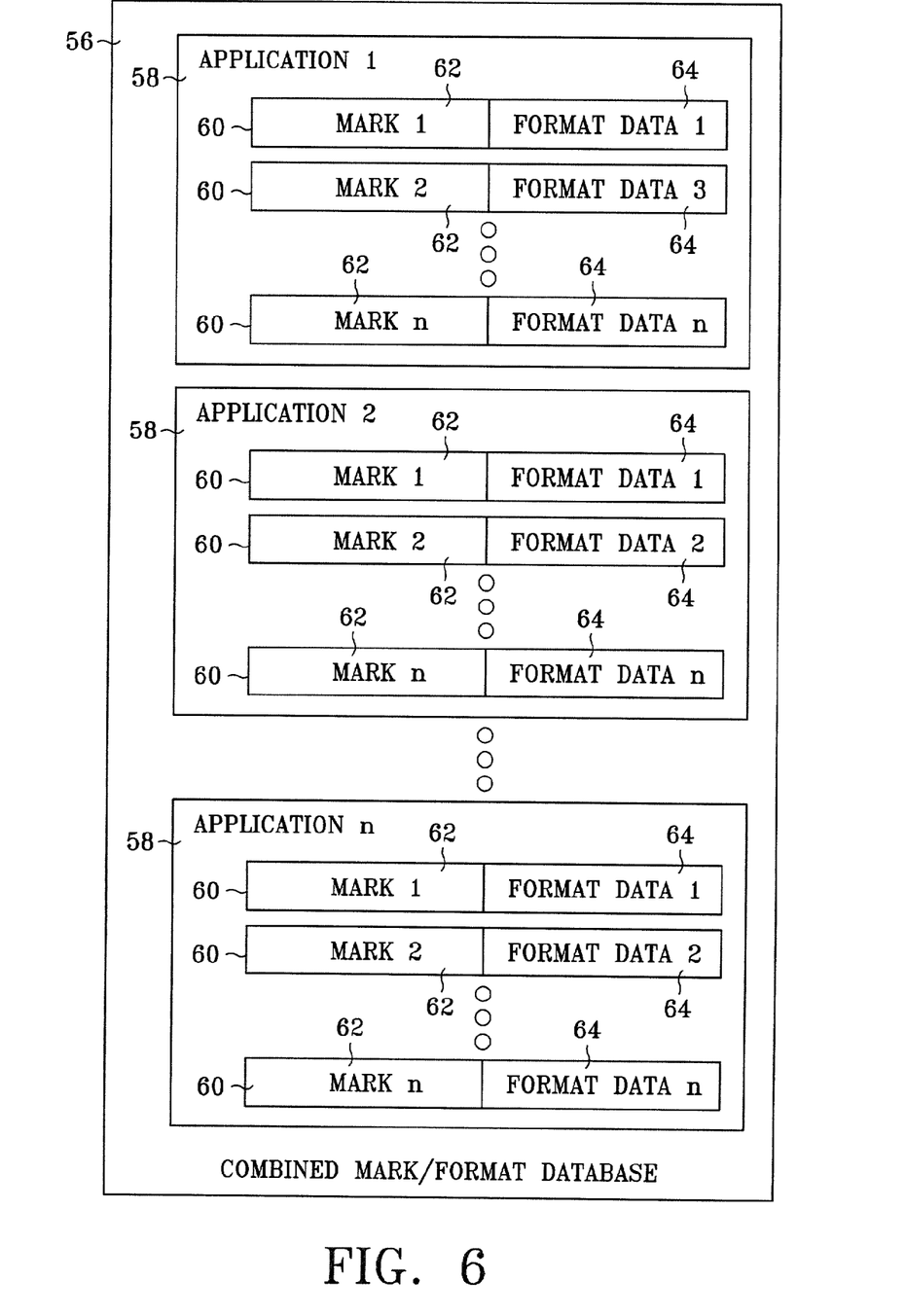
FIG. 6 is a block diagram illustrating a combined mark/format database.

While FIG. 5 shows mark and format databases 46 and 54 as distinct components of data exchanger 20, mark and format databases 46 and 54 may be one and the same as illustrated in FIG. 6. FIG. 6 is a block diagram illustrating a combined mark/format database 56. Mark database 46 includes any number of application records 58. Application records 58 each represent data unique to a given local application. While FIGS. 2-4 illustrate local device 16 as containing a single local application 22, any number of local applications may be operating on local device 16. Each application record 58 includes format fields 60 containing mark 62. Format data 64 is associated with a mark 62 within each format field 60. When converting local file 30, data type identifier 42 locates format data within local file 30 for a particular distinct data string, and marker 44 retrieves a mark 62 associated with that format data from application record 58 established for local application 22, converts the distinct data string into simple text, and associates the retrieved mark with the simple text. When converting mobile file 32, mark reader 50 locates a mark associated with simple text within mobile file 32, and formatter 52 retrieves format data 64 associated with that mark from application record 58 established for mobile application 26 and converts the simple text into a distinct data string using the retrieved format data 64.

Figure 7:
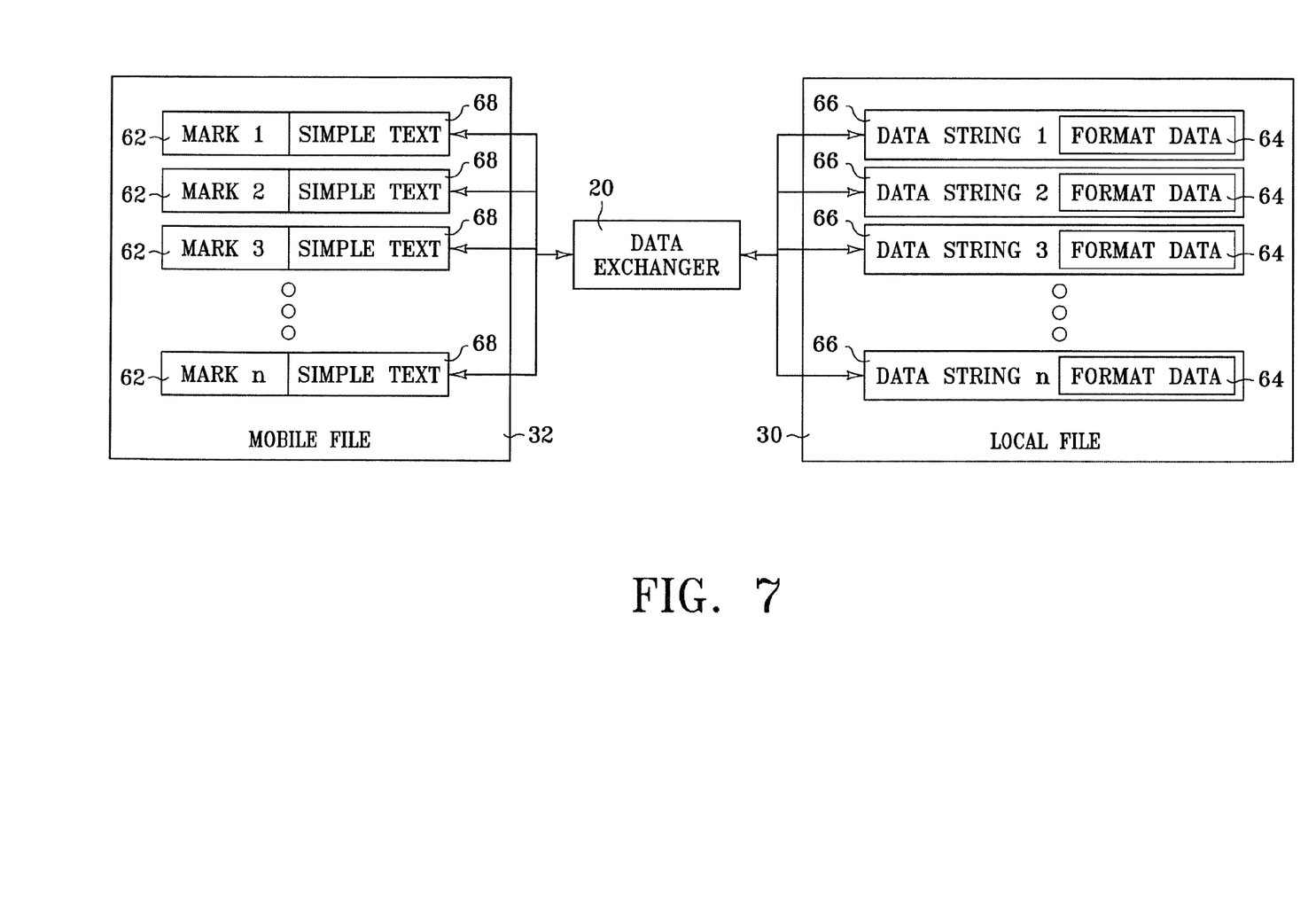
FIG. 7 is a block diagram illustrating a data exchanger operating on a mobile file and a local file according to one embodiment of the present invention.

FIG. 7 is a block diagram illustrating data exchanger 20 operating on local file 30 and mobile file 32. Local file 30 includes a series of distinct data strings 66 each containing format data 64. Mobile file 32 includes a series of marks 62 each associated with simple text 68. When converting local file 30 into mobile file 32, data exchanger 20 identifies distinct data strings 66 and the format data 64 for each. For each distinct data string 66, data exchanger 20 retrieves a mark 62 from mark database 46, the mark representing format data 64 for that distinct data string 66. Data exchanger 20 converts the distinct data string 66 into simple text associating the simple text with the retrieved mark 62. Once each of the distinct data strings 66 are converted, data exchanger 20 compiles the resulting simple text and mark pairs forming mobile file 32.

When converting mobile file 32 into local file 30, data exchanger 20 locates marks 62 and identifies the simple text 68 associated with each. For each identified mark 62, data exchanger 20 retrieves format data 64 represented by that mark 62 from format database 54. Data exchanger 20 then formats the simple text 68 associated with that mark 62 using the retrieved format data 64 creating a distinct data string. Once all the simple text 68 is formatted, data exchanger 20 compiles the resulting distinct data strings 66 forming local file 32.

The block diagrams of FIGS. 2-7 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain the programming of the present invention for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Figure 8:
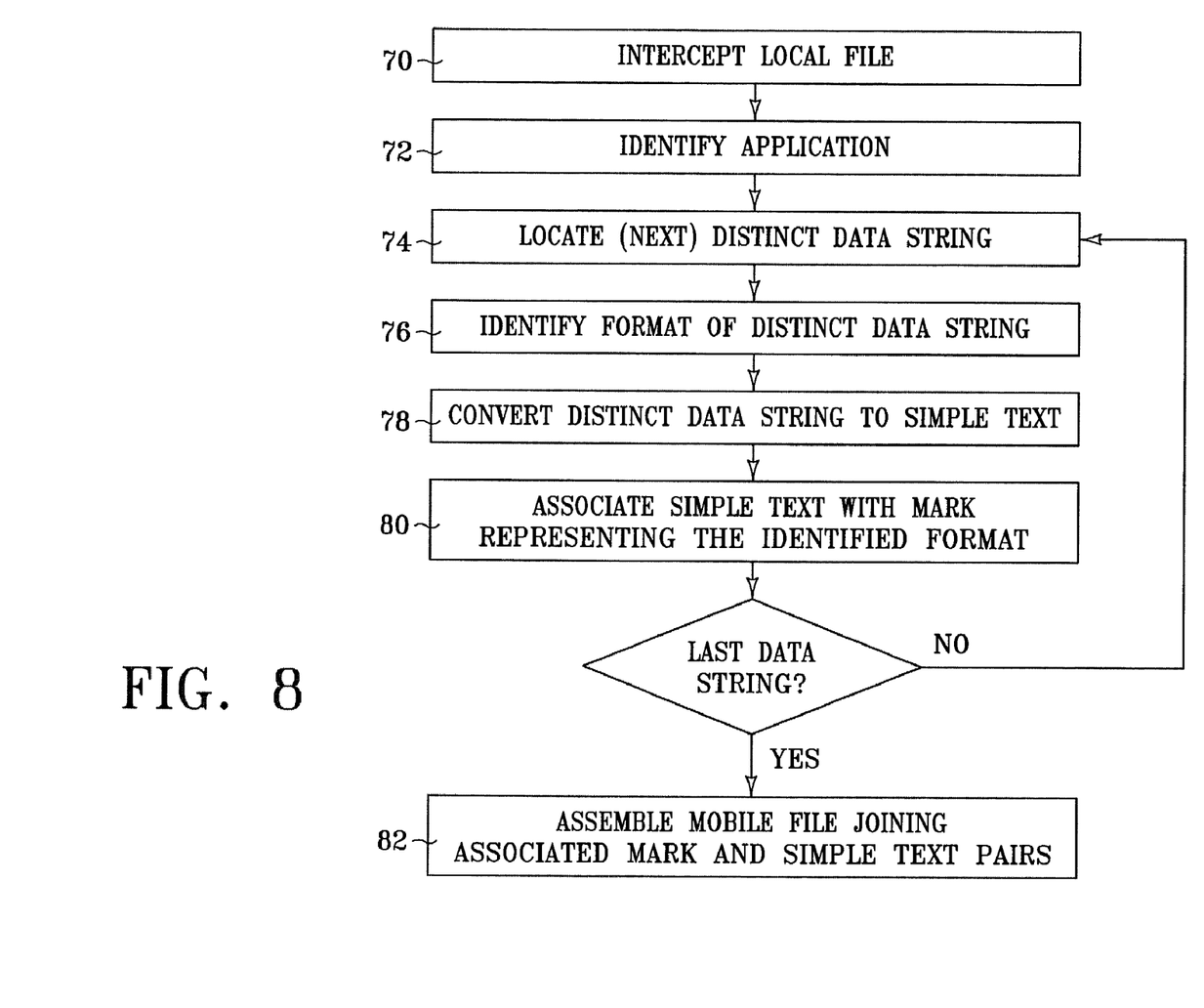
FIG. 8 is a flow diagram illustrating the steps taken to convert a local file to a mobile file according to one embodiment of the present invention.

OPERATION: The operation of data exchanger 20 will now be described with reference to the flow diagrams of FIGS. 8 and 9. FIG. 8 provides an example of the steps taken to convert a local file 30 to a mobile file 32 while FIG. 9 provides an example of the steps taken to convert the mobile file 32 back to a local file 30.

Beginning with FIG. 8, data exchanger 20 intercepts a local file 30 being transferred to mobile device 12 (step 70). Local application identifier 40 identifies local application 22 used to generate and/or utilize the intercepted local file 30 (step 72). Data type identifier 42 scans local file 30 to locate a distinct data string 66 (step 74), and formatter 52 identifies format data 64 for that distinct data string 66 (step 76). Formatter 52 then converts the distinct data string 66 into simple text 68 (step 78), retrieves a mark 62 representing format data 64 from mark database 46, and associates the converted simple text 68 with the retrieved mark 62 (step 80). Where local file 30 contains additional distinct data strings 66, the process repeats with step 74. Otherwise formatter 52 assembles mobile file 32 joining each converted simple text 68 and mark 62 pairs (step 82).

Figure 9:
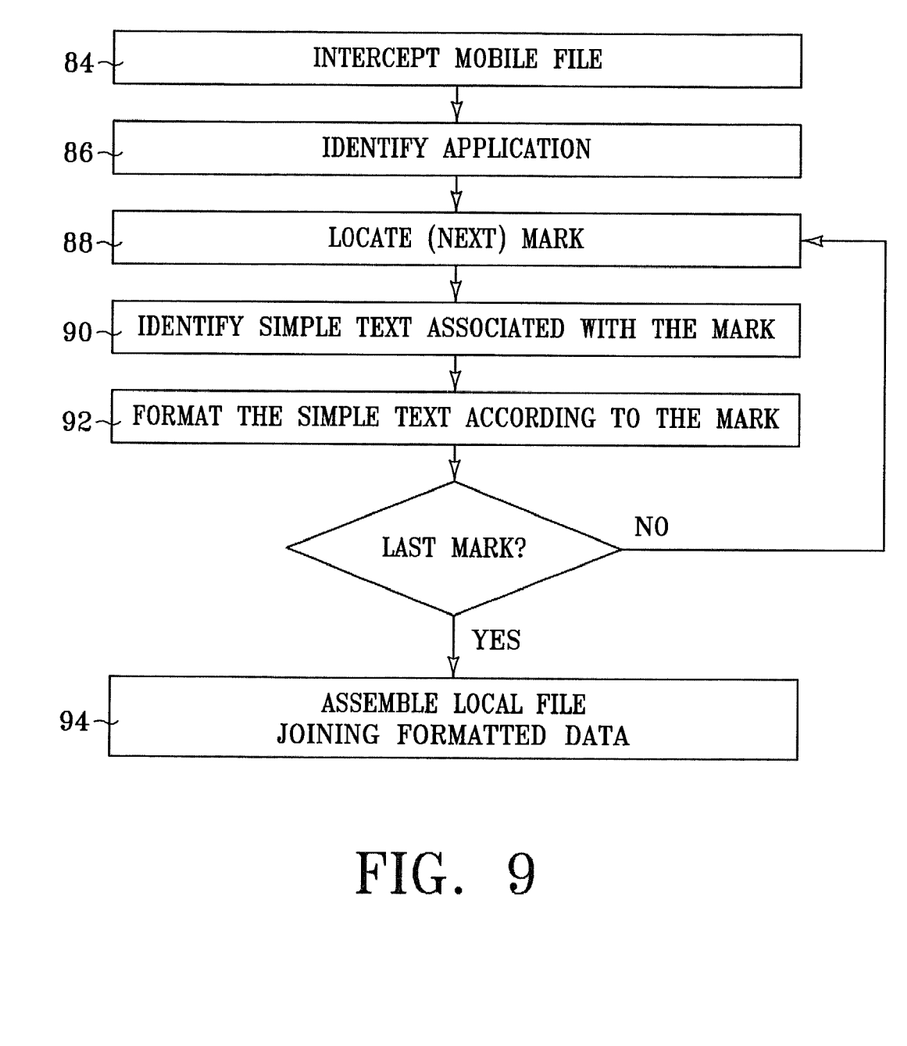
FIG. 9 is a flow diagram illustrating the steps taken to convert a mobile file to a local file according to one embodiment of the present invention.

Referring now to FIG. 9, data exchanger 20 intercepts a mobile file 32 being transferred to local device 16 (step 84). Mobile application identifier 48 identifies the mobile application 26 utilizing mobile file 32 (step 86). Mark reader 50 scans mobile file 32 locating a mark 62 (step 88). Formatter 52 identifies the simple text 68 associated with the mark 62 (step 90), retrieves format data 64 associated with the mark 62 from format database 54, and formats the simple text 68 according to the format data 64 producing a distinct data string 66 (step 92). Where mobile file 32 contains additional marks 62, the process repeats with step 88. Otherwise, formatter 52 assembles local file 30 joining each of the distinct data strings 66 produced in step 92 (step 94).

Although the flowcharts of FIGS. 8 and 9 show a specific order of execution, the order of execution may differ from that which is depicted. For example, the order of execution of two or more blocks may be scrambled relative to the order shown. Also, two or more blocks shown in succession in FIGS. 8 and 9 may be executed concurrently or with partial concurrence. All such variations are within the scope of the present invention. The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A method for converting an electronic file, comprising:
   intercepting the electronic file;
   locating distinct data strings within the electronic file, each distinct data string being a portion of the electronic file sharing a common formatting; and
   for each distinct data string, obtaining format data from the distinct data string, the format data representing the common formatting for that distinct data string, converting the distinct data string to simple text, associating the converted simple text with a mark representing the obtained format data, the mark identifying the common formatting of the distinct data string converted to simple text, and joining the converted simple text and associated mark pair with previously converted simple text and associated mark pairs to assemble a converted electronic file.

2. A method for converting an electronic file comprising:
   intercepting the electronic file;
   locating a mark within the electronic file, the mark identifying a format to which simple text is to be converted;
   identifying simple text associated with the mark;
   formatting the simple text according to the mark forming a distinct data string, the distinct data string sharing a common formatting identified by the mark;
   joining the formed distinct data string with previously formed distinct data strings, if any;
   assembling a converted electronic file by repeating the acts of locating, identifying, formatting, and joining for each mark in the electronic file.

3. The method of claim 2, further comprising the act of retrieving format data associated with the mark from a format database and wherein the act of formatting comprises formatting the simple text with the format data.

4. A method for converting an electronic file comprising the acts of:
   intercepting the electronic file;
   locating marks within the electronic file, each mark identifying a format to which simple text is to be converted;
   identifying simple text associated with the marks; for each located mark, forming a distinct data string by formatting the simple text according to the mark associated with that mark, the distinct data string sharing a common formatting identified by the mark; and
   joining the formed distinct data strings to assemble a converted electronic file.

5. A computer readable medium having instructions for:
   intercepting an electronic file;
   locating distinct data strings within the electronic file, each distinct data string being a portion of the electronic file sharing a common formatting; and
   for each distinct data string, obtaining format data from the distinct data string, the format data representing the common formatting for that distinct data string, converting the distinct data string to simple text, associating the converted simple text with a mark representing the obtained format data, the mark identifying the common formatting of the distinct data string converted to simple text~ and joining the converted simple text and associated mark pair with previously converted simple text and associated mark pairs to assemble a converted electronic file.

6. A computer readable medium having instructions for:
   intercepting an electronic file;
   locating marks within the electronic file, each mark identifying a format to which simple text is to be converted,
   identifying simple text associated with the marks; for each located mark, forming a distinct data string by formatting the simple text according to the mark associated with that mark, the distinct data string sharing a common formatting identified by the mark; and
   joining the formed distinct data strings to assemble a converted electronic file.

\* \* \* \* \*